R. TROELSON.
ATTACHMENT FOR MOWING MACHINES.
APPLICATION FILED JAN. 29, 1913.
1,063,305.
Patented June 3, 1913.
2 SHEETS—SHEET 2.
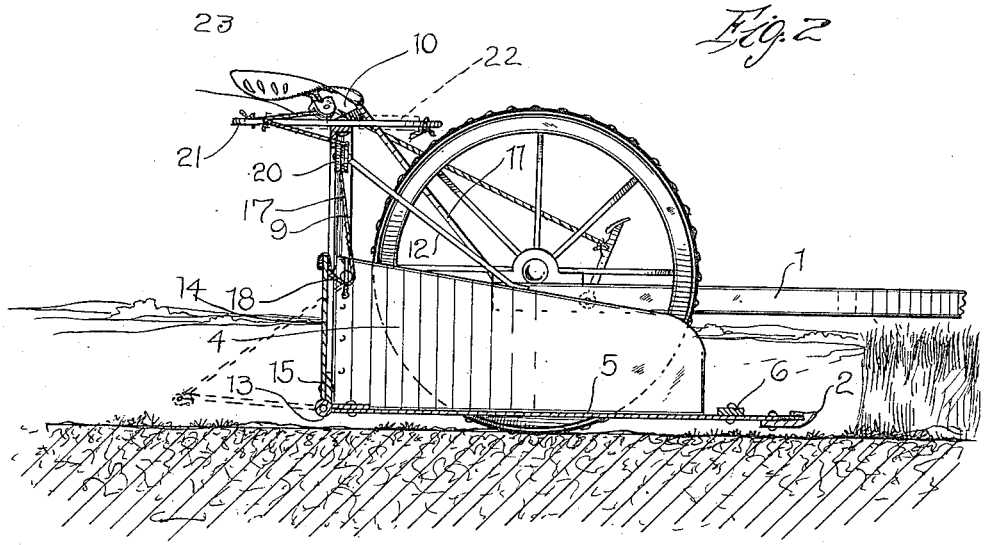
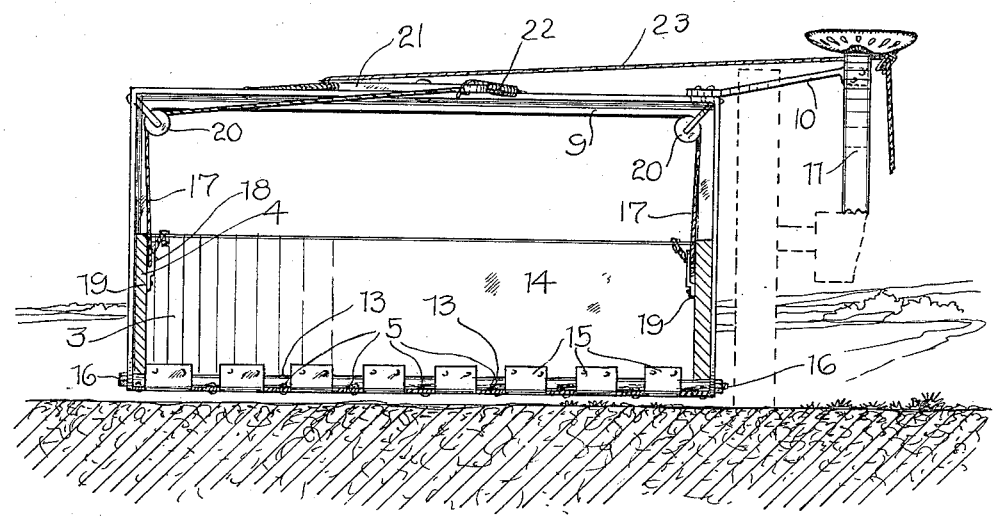
Witnesses
Robert M. Sutphen.
A. D. Hind.
Inventor
Rasmus Troelson
By Watson E. Coleman
Attorney

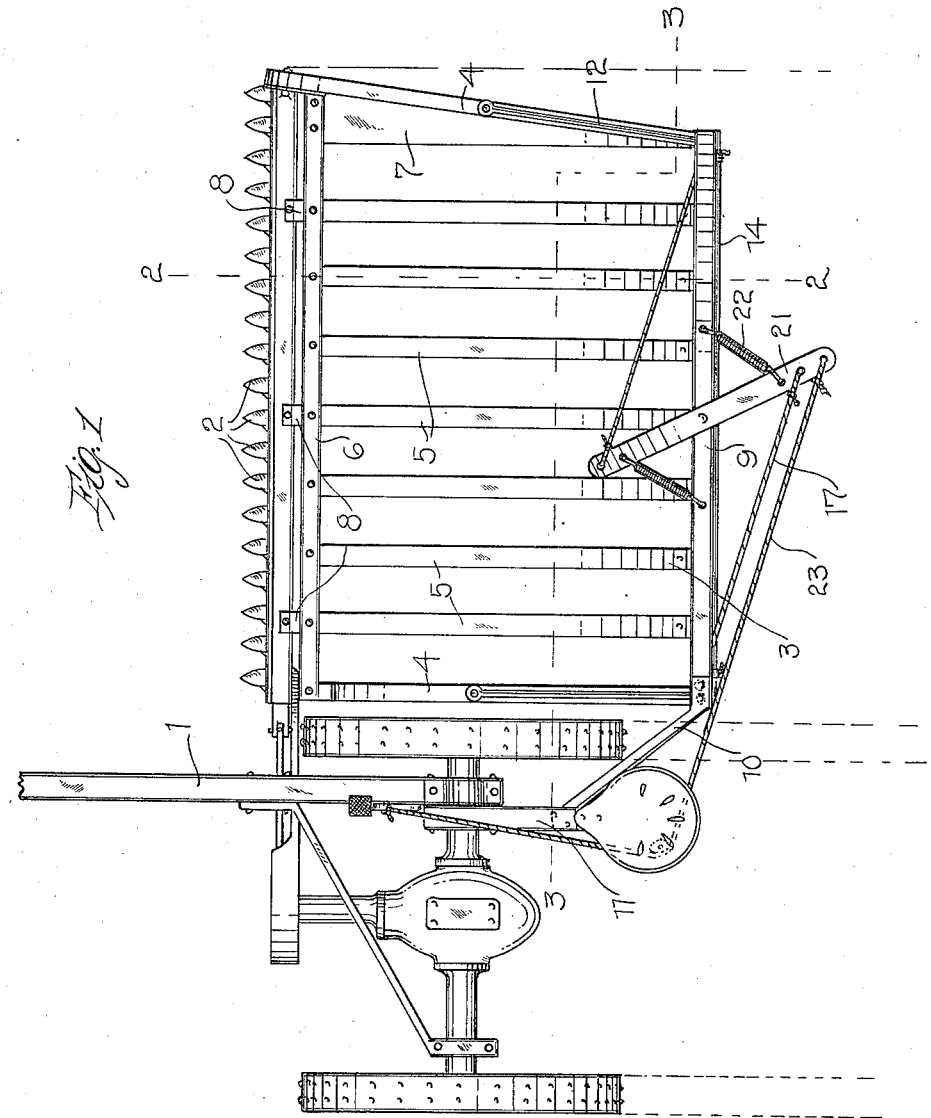

UNITED STATES PATENT OFFICE.

RASMUS TROELSON, OF IRWIN, NEBRASKA.

ATTACHMENT FOR MOWING-MACHINES.

1,063,305.   Specification of Letters Patent.   Patented June 3, 1913.

Application filed January 29, 1913. Serial No. 745,031.

*To all whom it may concern:*

Be it known that I, RASMUS TROELSON, a citizen of the United States, residing at Irwin, in the county of Cherry and State of Nebraska, have invented certain new and useful Improvements in Attachments for Mowing-Machines, of which the following is a specification, reference being had to the accompanying drawings.

This invention relates to new and useful improvements in mowing machines and more particularly to an attachment thereto for gathering grain, clover and the like and bunching the same.

A further object of the invention resides in providing an improved bunching attachment or windrower which may be readily operated from the seat of the machine and which will be secure in its fastening throughout the use thereof.

Still another object of the invention resides in providing an improved operating means for the hinged plate or door thereon and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a plan view of the device showing a portion of a mowing machine in connection therewith. Fig. 2 is a vertical section through the same as seen on line 2—2, Fig. 1. Fig. 3 is a similar view therethrough as seen on line 3—3, Fig. 1.

In describing my invention, I shall refer to the drawings in which similar reference characters designate corresponding parts throughout the several views and in which—

1 indicates the beam of a mowing machine of the usual or any preferred type, which supports the laterally extending finger bar 2, together with the cutters thereon, said finger bar and cutters being supported from the beam and operated in any preferred manner. As the machine proper forms no essential part of the invention, just sufficient disclosure will be made thereof and sufficient description of the same given, as will enable one to clearly understand the application of my attachment to use thereon.

My invention consists of a gathering or bunching attachment adapted for connection with the finger bar of a machine and to this end, I provide a receptacle 3. This receptacle consists of a pair of side bars 4, which tend to converge toward their rear ends, said side bars being tapered in height from their front to their rear ends, and a bottom for the device is formed of a plurality of longitudinal slats or strips 5 which are connected together at their forward ends by a transverse bar or strip 6 riveted thereto. The inner side bar 4 is secured to the one end strip 5, while the opposite side bar 4 is secured to a plate-like strip 7 which is of considerable width at its forward end and tapered in width toward its rear end so that the latter end is equal in width to the width of the other strips 5. The transverse forward end strip or bar 6 is, of course, also engaged with the one end strip 5 and the plate-like strip 7 and certain of the strips have the ends thereof extended beyond the transverse strip or bar 5 and secured to the finger bar 2, as shown at 8.

Secured to the outer faces of the side bars 4, are the sides of an arch bar 9, preferably formed of angle iron and engaged with one arm of this arch bar is the end of a bracing arm 10, the opposite end of said bracing arm being engaged with a seat post 11 on the beam 1. These side bars of the arch bar are also braced by means of the bracing bars 12 which are engaged with said arms of the arch bar and also with the side bars 4. The purpose of said arch bar will be hereinafter and more particularly described.

The rear ends of the strips 5 which form the bottom for the gathering or bunching receptacle are bent inwardly upon themselves and riveted to form loops or knuckles 13 and a rear wall or plate 14 has the lower edge thereof provided with a plurality of spaced knuckles 15 which are adapted to alternate the loops or knuckles 13. A pintle 16 is disposed through the knuckles 13 and 15, whereby to hingedly mount the rear wall in position on the device. I have provided means for normally retaining this rear wall in its raised position and capable of being lowered when desired, and to this end, flexible connections 17 are engaged with the upper end of the rear wall, adjacent the side edges thereof. Rollers 18 are supported in angular keepers 19 on the inner opposed faces of the side bars 4, adjacent their rear ends and these connections 17 are extended over these rollers and upwardly over pulleys 20 which are supported at the upper ends of the arms of the arch bar. A flat lever 21 is fulcrumed intermediate of its ends on the upper face of the horizontal portion of the arch bar and the two flexible connections 17 are engaged with this lever on opposite sides of the fulcrum point. Engaged with the lever and arch bar on opposite sides of the fulcrum point are the coil springs 22 which normally hold said lever in such position as to draw the connections 17 taut, thereby retaining said rear wall 14 in its raised position. When it is desired, therefore, to lower the rear wall 14, to allow the contents of the receptacle to be discharged therefrom, the one end of the lever 21 may be drawn toward the beam 1 and in order to accomplish this result, an additional flexible connection 23 is provided and engaged therewith. This flexible connection extends to a convenient operating mechanism on the beam adjacent the seat whereby the driver may readily operate said lever when desired.

While I have shown two springs in connection with the lever and arch bar, it will be understood that if necessary, one of the same may be eliminated and, in fact, various changes in form, proportion and in the minor details of construction may be resorted to without departing from the spirit or sacrificing any of the principles of the invention.

From the foregoing it will be seen that I have provided an improved bunching attachment or windrower for mowing machines which is simple in construction, inexpensive to manufacture and one which will be very efficient and useful in operation.

Having thus described this invention, what I claim is:—

1. In an attachment for mowing machines, the combination with a finger bar; of a receptacle comprising side bars, a bottom therefor, composed of longitudinal and spaced apart strips, certain of which are extended beyond the ends of the side bars and secured to the finger bar, a rear wall hingedly secured to the rear ends of said strips and adapted to abut the rear ends of said side bars, an arch bar secured to said side bars at the rear ends thereof, a lever fulcrumed intermediate of its ends on the hinged portion of said arch bar, connecting means between said lever and said hinged rear wall, means in connection with said arch bar and said lever to normally retain the latter in such position as to dispose the hinged rear wall to its raised position, and means for actuating said lever.

2. In an attachment for mowing machines, the combination with a finger bar; of a receptacle comprising a pair of side bars, a bottom therefor consisting of a plurality of longitudinally spaced apart strips, means for retaining said strips in spaced relation to one another, certain of said strips being extended beyond the forward ends of said side bars and secured to said finger bar, a plate hingedly engaged with the rear ends of said strips and adapted to abut the rear ends of the side bars to form a rear wall for the receptacle, an arch bar having the sides thereof secured to the side bars, a lever fulcrumed intermediate of its ends on the horizontal portion of said arch bar, flexible connections having one of their ends engaged with the upper end of said hinged rear wall, the opposite ends thereof being respectively engaged with the lever on opposite sides of the fulcrum point thereof, means on the inner opposed faces of the side bars and side arms of the arch bar for guiding said flexible connections, spring means engaged with said arch bar and said lever for normally disposing said lever in position to retain the hinged wall in its raised position, and means for actuating said lever to permit said hinged wall to be lowered.

3. In an attachment for mowing machines, the combination with a finger bar; of a receptacle comprising a pair of side bars, a bottom therefor consisting of a plurality of longitudinally spaced apart straps, means for retaining said straps in spaced relation to one another, certain of said straps being extended beyond the forward ends of said side bars, and secured to said finger bar, a plate hingedly engaged with the rear ends of said straps and adapted to abut the rear ends of the side bars to form a rear wall for the receptacle, an arch bar having the side arms thereof secured to the side bars, a lever fulcrumed intermediate of its ends on the horizontal portion of said arch bar, flexible connections having one of their ends engaged with the upper end of said hinged wall, the opposite ends thereof being respectively engaged with the lever on opposite sides of the fulcrum point thereof, guide pulleys, and guide rollers carried respectively on said arch bar and side bars of the receptacle over which said flexible connections extend, coil spring members connected with said lever and the horizontal portion of said arch bar on opposite sides of the aforesaid fulcrum point, said spring members normally retaining said lever in such position as to normally dispose the rear wall
5 in its raised position, and means for actuating said lever to permit said hinged wall to be lowered.

In testimony whereof I hereunto affix my signature in the presence of two witnesses.

RASMUS TROELSON.

Witnesses:
A. C. BLANCHARD,
H. R. BANE.

Copies of this patent may be obtained for five cents each, by addressing the "Commissioner of Patents, Washington, D. C."